Dec. 5, 1967    J. F. WATSON ET AL    3,356,586
FUEL ELEMENT CONTAINING ACTIVATED CARBON
Filed April 14, 1967
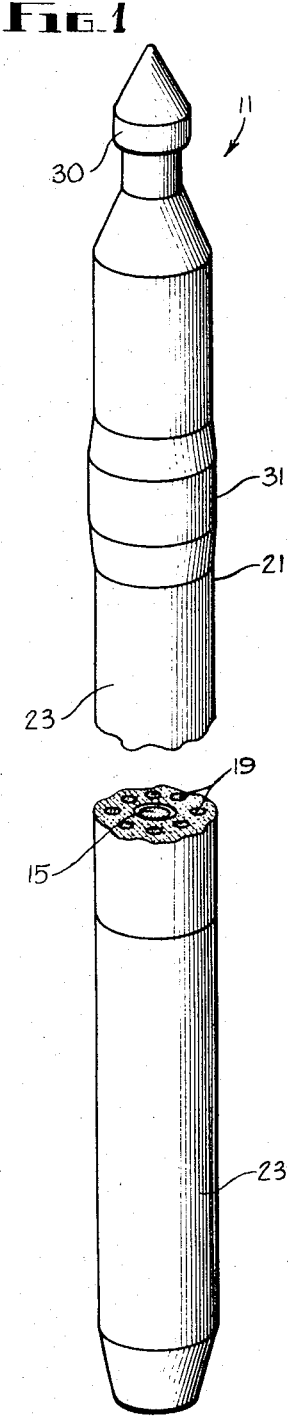
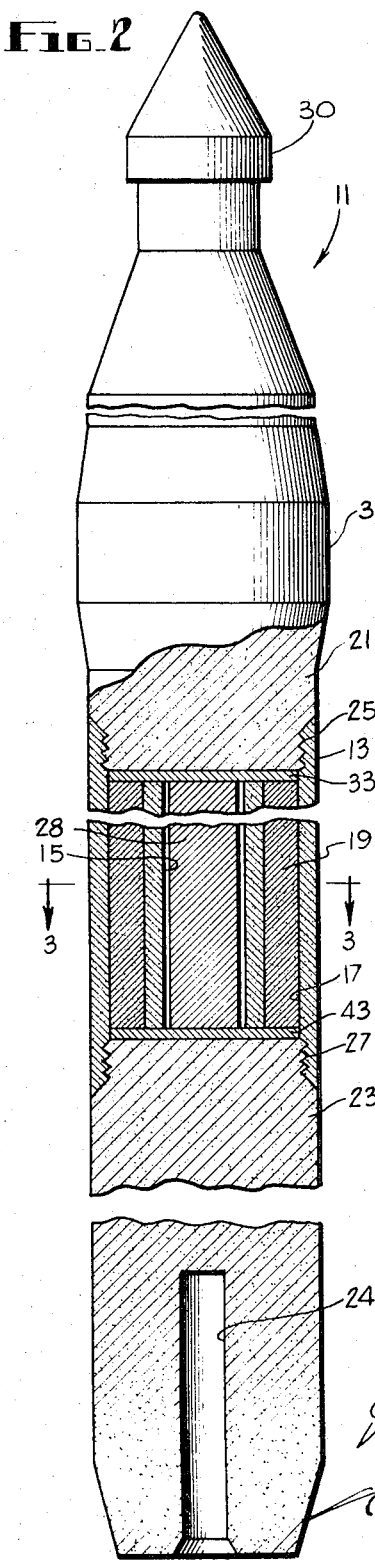
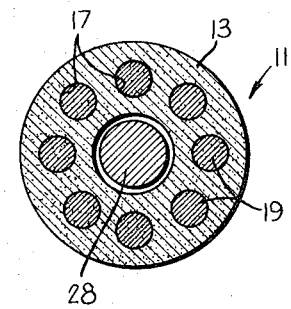
INVENTORS
JAMES F. WATSON
WALTER V. GOEDDEL
ATTORNEY

United States Patent Office 3,356,586
Patented Dec. 5, 1967

3,356,586
FUEL ELEMENT CONTAINING
ACTIVATED CARBON
James F. Watson, San Diego, and Walter V. Goeddel,
Poway, Calif., assignors to the United States of America
as represented by the United States Atomic Energy
Commission
Filed Apr. 14, 1967, Ser. No. 631,105
5 Claims. (Cl. 176—69)

ABSTRACT OF THE DISCLOSURE

A nuclear fuel element with improved heavy metal ion fission product retention. The fuel element includes high surface area activated carbon dispersed within a fuel chamber wherein nuclear fuel particles are disposed.

The present invention relates to nuclear fuel elements for use in nuclear reactors and more particularly relates to fuel elements with improved fission product retention characteristics.

Various nuclear fuel element designs have been proposed wherein nuclear fuel particles are loaded directly into a chamber provided therefor to form a bed of loose particles. The beds may be subsequently treated, as by vibratory compaction, to provide packed beds with a high loading density of nuclear fuel. The packed beds of nuclear fuel particles may also be treated by various techniques to bond the particles into a rigid structure. Such designs are attractive in that the nuclear fuel is easily loaded into the fuel element and may be easily recovered for subsequent reprocessing without damaging the structural components of the fuel element. However, certain disadvantages are also associated with such loose or packed beds of fuel particles.

Radioactive fission products which escape from the fuel particles in the bed are free to migrate directly to the walls of the fuel chamber and subsequently through the material in which the chamber is disposed and into the coolant stream. It is costly to fabricate fuel elements from materials that are highly resistant to the passage of fission products so that this solution to the problem is not totally satisfacory. Generally the fission products should be delayed as long as possible in the fuel elements so the radioactivity of the fission products is greatly decreased by the time they reach the coolant stream.

Various other methods have been proposed whereby the passage of fission products may be delayed or whereby heavy metal fission products, such as Ba, Cs, Ce, or Sr, may be trapped. It is known to coat fuel particles with one or more layers of pyrolytic carbon to further delay the passage of fission products therefrom. In the event of an accident resulting in a steam leak and the rupture of a fuel element, however, the carbon coatings of the particles are subject to attack by the steam.

It is an object of the present invention to provide nuclear fuel elements having improved operating characteristics. It is another object to provide fuel elements having excellent retention of fission products. A still further object is to provide fuel elements which incorporate protection for coated nuclear fuel material in case of reactor malfunction andwhich can be inexpensively constructed.

These and other objects of the invention are more particularly set forth in the following detailed description and in the accompanying drawings wherein:

FIGURE 1 is a perspective view, partially broken away, of a fuel element embodying various of the features of the invention;

FIGURE 2 is an elevational view partially broken away and partially in section, of the fuel element of FIGURE 1; and FIGURE 3 is a sectional view taken along line 3—3 of FIGURE 2.

A fuel element 11, which is considered well suited for use in a high temperature gas-cooled nuclear reactor that is designed to operate at high power levels and which embodies various features of the present invention, is illustrated in FIGURES 1 through 3. Generally, the fuel element 11 comprises an elongated body section 13 having a central bore 15 extending longitudinally therethrough. A plurality of holes or fuel chambers 17 which contain beds of loose or packed particulate nuclear fuel material 19 are provided in the body section 13, extending longitudinally therethrough, parallel to the bore 15. For the purposes of this application, the term "nuclear fuel" should be understood to refer to either fissile materials, such as uranium 233, uranium 235, plutonium 239, etc., or componds thereof, and fertiel material, such as thorium 232, uranium 238, etc., or compounds thereof. The body section 13 is made of a material having a fairly high thermal conductivity, such as dense graphite, to assure good heat transfer from the fuel chamber 17 to the outer surface of the body section, where transfer to the coolant stream takes place.

In more detail the illustrated fuel element 11 comprises the body section 13 disposed between a top reflector 21 and a bottom reflector 23. The fuel element 11 is designed to be disposed vertically in a nuclear reactor with its primary point of support being at the bottom via a well 24 in the bottom reflector 23 which engages an upstanding pin (not shown). Because the fuel element 11 is designed for use in a gas-cooled nuclear reactor, it is described and discussed in conjunction therewith. However, it should be appreciated that various of the features of the fuel element 11 are likewise applicable to fuel elements for other types of reactors.

The body section 13 is preferably constructed of graphite. The central bore 15 and the plurality of longitudinally extending spaced apart fuel chambers 17 may be provided in the body section 13 in any suitable manner, e.g., as by machining a cylinder of graphite or extrusion. Internal threads 25, 27 are provided at the top and bottom, respectively, of the body section 13, to join it to the top reflector 21 and the bottom reflector 23.

The bore 15 of the fuel element 11 serves as a housing for a central moderator 28, such as beryllium oxide, beryllium carbide, etc. The top reflector 21 is graphite machined to have a grappling knob 30 at its upper end. A spacer ring 31 intermediate the ends of the top reflector 21 serves to laterally abut spacer rings on adjacent fuel elements within a nuclear reactor core, assuring minimal spacing therebetween and providing lateral support for the elements. The lower end of the top reflector 21 has external threads machined thereon which meet with internal threads 25 provided at the upper end of the body section 13. A thin graphite disc 33 closes the upper ends of the bore 15 and of the fuel chambers 17 and serves as a gasket. A graphite disc 43 serves as a gasket between body section 13 and the lower reflector 23.

All fuel particles, even pyrolytic carbon-coated fuel particles, release some heavy metal ion fission products (e.g., Ba, Cs, Ce or Sr) at the high temperatures encountered in operation of a gas-cooled nuclear reactor (e.g., 1000° C. to 1500° C.). It has been found that migration of such heavy metal ion fission products to the coolant stream is minimized by placing high surface area activated carbon into the void spaces contained between particulate coated fuel particles. Such activated carbon acts to adsorb the heavy ion fission porducts and minimize their migration and release into the coolant circuit.

It has also been found that activated carbon acts as a sacrificial material to protect the coated fuel particles from steam attack in the event of a steam leak. When steam comes in contact with coated fuel particles as a result of a steam leak the pyrolytic carbon coating of the fuel particles is attacked and eroded. This permits any nuclear fission products which had been trapped by the carbon coating to be released into the coolant stream. Activated carbon, used in accordance with the present invention, provides a material that is more reactive with steam than is the pyrolytic carbon coating of the fuel particles. The activated carbon acts as a sacrificial material during the time required to repair the steam leak.

As used herein, "activated carbon" is charcoal which has been treated so as to have open pores in the 12 to 1000 Angstrom unit diameter range. Activated carbon may generally be produced from any carbonaceous raw material, such as wood, peat, lignite, bone, nut shells, coal, petroleum, coke, and other residues. The activated carbon may be produced from the carbonaceous raw material by selective oxidation with steam, carbon dioxide or air or by chemical treatment, such as by mixing with metal chlorides, sulfides or phosphates, or potassium sulfide, potassium thiocyanate or phosphoric acid followed by calcining and washing the residue. The activated carbon should have a surface area of at least about 300 square meters per gram ($m.^2/gm.$), preferably from about 500 $m.^2/gm.$ to about 1000 $m.^2/gm.$ Although any particulate nuclear fuel material may be used, it is preferred to use spheroidal particles in the size range of from about 100 microns to about 600 microns in diameter. When such spheroidal shapes are used there is in the neighborhood of about 36 percent of volume of the bed that is not occupied by the particles when the particles are loosely filled into the fuel chamber 17. Decreased levels of void volume may be achieved by using spheroidal particles with a range of diameters.

The total weight of activated carbon that can be placed in surrounding relationship to the fuel particles, expressed as grams of activated carbon per cubic centimeter of fuel chamber (gm./cc.), is dependent on the range of particle sizes of the nuclear fuel particles, the degree of packing of the fuel particles, the particle size of the activated carbon and the degree of packing of the activated carbon. In general, for fully packed beds of spheroidal nuclear fuel particles having generally the same diameter, activated carbon loadings of from about 0.1 gm./cc. to about 0.4 gm./cc. of fuel chamber volume may be achieved. It is generally preferred to use the maximum activated carbon loading attainable without reducing the nuclear fuel particle content of the fuel chamber. In this connection the surface area of the activated carbon is not related to the particle size of the activated carbon particles. Therefore, it is preferred to use particle size range of activated carbon that result in maximum packing density. Particle size ranges up to about 200 microns may be used, although it is preferred to use a particle size range below about 50 microns.

The activated carbon may be loaded into the fuel chambers by any suitable method. The activated carbon and the fuel particles may be pre-blended in a suitable blender, such as a V-blender, and the mixture may then be loaded into the fuel chamber. However, due to the difference in density between the activated carbon and the fuel particles, some non-uniformity may be encountered at different heights within the fuel chamber when the preblended fuel particles and activated carbon are loaded together into the fuel chamber. It is therefore preferred to first pack the fuel chamber with the nuclear fuel particles and then to fill the void spaces between the fuel particles with the activated carbon by a suitable method, such as by causing the activated carbon to flow down through the interstices of the fuel particles by vibration.

The mixture of fuel particles and activated carbon may be bonded to provide rigid beds of nuclear fuel. Such bonding techniques, as shown for example in U.S. Patent No. 3,274,068, are well known.

The following example illustrates one method of making a particular fuel element of the type described above. It should be understood that the method of this example is applicable to other types of fuel elements and should in no way limit the scope of the invention, which is defined in the appended claims.

*Example I*

A generally cylindrical fuel element 11 of a type adapted for use in a high temperature reactor using helium as a coolant is made having a diameter of 4½ inches. The top reflector 21 and the bottom connector 23 are machined from cylindrical sections of reactor grade graphite.

The graphite body section 13 is extruded, using conventional extrusion techniques for graphite. The extruded annular body section 13 has an outer diameter of 4½ inches, an internal bore of 1½ inches and a length of about 15 feet, 10 inches. Twelve radially disposed fuel chambers 17 are provided in the extrusion. The fuel chambers have cross-sections which are circular and which are about ¾ inch in diameter. The treated body section has a gas permeability to helium at room temperature of about $5 \times 10^{-2}$ cm.$^2$/sec.

The fuel element 11 is assembled by first placing the lower retaining disc 43 in the recess provided therefor in the body section 13 and the bottom reflector 23 is then screwed into place to provide a sub-assembly.

Nuclear fuel particles of thorium dicarbide and enriched uranium carbide (in a 10:1 ratio thorium to uranium) are used which have an average diameter of about 700 microns, including a 100-micron thick coating of pyrolytic carbon. The nuclear fuel particles are loaded into the circular fuel chambers 19 and are then packed to maximum concentration by vibratory compaction.

Activated carbon having a particle size range of up to about 50 microns is then loaded into the interstices of the packed fuel particles while the sub-assembly is vibrated. A loading of 0.2 gram of activated carbon per cc. of fuel chamber volume is used. The volume percentage of fuel particles within the fuel chamber 17 is 62 percent.

The retainer disc 33 is then put in place and the top reflector 21 is screwed into place to compelte the assembly of the fuel element 11.

Comparison of the fuel element 11 vs. a similar fuel element of the same size, shape, fuel content and materials of construction, but which utilizes a packed bed of fuel particles without surround the fuel particles with activated carbon, shows that the fuel element 11 is superior. The migration of metal ion fission products from the fuel chambers 17 through the body section 13 and into the coolant stream is significantly reduced for fuel element 11 as compared with the similar fuel element without activated carbon as measured by the net release ratio (NRR). NRR refers to the amount of a particular fission product material which is exterior to the fuel element as compared to the amount retained inside the fuel element. Therefore the smaller the number the better the fission product retention of the fuel element. The NRR at a median fuel temperature of 820° C. for the fuel element of the present invention is about $6.4 \times 10^{-7}$ for Sr 89 as compared to an NRR of about $9 \times 10^{-5}$ for a similar fuel element without activated carbon. For Sr 90 the NRR for the fuel element of the present invention is about $4.3 \times 10^{-3}$ as compared to an NRR of about $2.3 \times 10^{-2}$ for a similar fuel element without activated carbon.

In general, the improvement in NRR for fission products having a half life less than about one year of fuel elements with activated carbon is improved by a factor of at least about 10. The heat transfer characteristics of fuel element 11 are comparable to those of the similar fuel element without activated carbon.

The above illustrated fuel element combines economy of fabrication with efficient performance. It is considered to be well-suited for use in a high temperature gas-cooled nuclear reactor operating at high power density and near-breeding conditions. The use of packed beds of fuel particles facilitates loading of the fuel element 11 and reprocessing of the fuel. The bed of loose activated carbon acts to retain fission products and serves the additional function of acting as a sacrificial material in the event of a steam leak.

Various of the features of the invention are set forth in the appended claims.

What is claimed is:

1. A nuclear fuel element comprising a fuel chamber, nuclear fuel particles disposed in said chamber, and activated carbon dispersed in said chamber, said activated carbon having a surface area of at least about 300 square meters per gram.

2. A fuel element in accordance with claim 1 wherein said activated carbon has a particle size of less than about 200 microns.

3. A fuel element in accordance with claim 1 wherein said fuel particles are coated with pyrolytic carbon which is less reactive to steam than said activated carbon.

4. A fuel element in accordance with claim 1 wherein said fuel particles comprise at least about 60 volume percent of said chamber and wherein said activated carbon occupies from about 40 percent to about 80 percent by volume of the remaining void space and is uniformly distributed in the interstices between said fuel particles.

5. A fuel element in accordance with claim 4 wherein said uniform distribution of charcoal is achieved by vibration.

References Cited
UNITED STATES PATENTS

| | | | |
|---|---|---|---|
| 3,212,989 | 10/1965 | Fitzer et al. | 176—71 |
| 3,224,944 | 12/1965 | Turner et al. | 176—69 |
| 3,252,869 | 5/1966 | Koutz | 176—71 X |
| 3,274,068 | 9/1966 | Koutz et al. | 176—69 |

CARL D. QUARFORTH, *Primary Examiner.*

M. J. SCOLNICK, *Assistant Examiner.*